US005578365A

United States Patent [19]

Kume et al.

[11] Patent Number: 5,578,365

[45] Date of Patent: Nov. 26, 1996

[54] LABEL SUBSTRATE INK AND LABEL

[75] Inventors: Katsuya Kume; Yozo Oishi; Mitsuo Kuramoto; Itsuroh Takenoshita, all of Osaka, Japan

[73] Assignee: Nitto Denko Corporation, Osaka, Japan

[21] Appl. No.: 553,191

[22] Filed: Nov. 7, 1995

Related U.S. Application Data

[63] Continuation of Ser. No. 153,169, Nov. 17, 1993, abandoned.

[30] Foreign Application Priority Data

Dec. 4, 1992 [JP] Japan .................................... 4-350736

[51] Int. Cl.$^{6}$ ........................................ B32B 3/00

[52] U.S. Cl. ...................... 428/195; 428/204; 428/304.4; 428/343; 428/402; 428/411.1; 428/447; 428/448; 428/688; 428/913

[58] Field of Search .................................... 428/195, 204, 428/304.4, 343, 402, 411.1, 447, 448, 688, 913

[56] References Cited

U.S. PATENT DOCUMENTS

| | | | |
|---|---|---|---|
| 2,976,184 | 3/1961 | Blatz | 117/138.8 |
| 3,811,915 | 5/1974 | Burrell et al. | 117/45 |
| 3,980,729 | 9/1976 | Yokokawa et al. | 260/826 |
| 4,000,108 | 12/1976 | Yokokawa et al. | 260/37 SB |
| 4,371,579 | 2/1983 | McCaskey et al. | 428/204 |
| 4,414,279 | 11/1983 | Bernelin et al. | 428/413 |
| 4,933,315 | 6/1990 | Kanto et al. | 503/227 |
| 5,204,163 | 4/1993 | Nakatsuka et al. | 428/195 |
| 5,258,234 | 11/1993 | Ide et al. | 428/500 |
| 5,270,109 | 12/1993 | Nishikawa et al. | 428/336 |

FOREIGN PATENT DOCUMENTS

| | | |
|---|---|---|
| 782005 | 8/1957 | United Kingdom . |
| 93 07844 | 4/1993 | WIPO . |

OTHER PUBLICATIONS

Database WPI, Section Ch, Week 9222, Derwert Publications Ltd., (JPA-4 115 991).

Database WPI, Section Ch, Week 9222, Derwert Publications Ltd., (JPA-4 113 889).

Database WPI, Section Ch, Week 9238, Derwent Publications Ltd. (JPA-4214390).

Database WPI, Section Ch, Week 9247, Derwent Publications Ltd. (JPA-4282684).

Database WPI, Section Ch, Week 8741, Derwent Publications Ltd. (JPA-62201242).

Patent Abstracts of Japan, vol. 13, No. 119 (C-579), Mar. 23, 1989 (JPA-63291962).

*Primary Examiner*—William A. Krynski
*Attorney, Agent, or Firm*—Sughrue, Mion, Zinn, Macpeak & Seas

[57] ABSTRACT

A label substrate comprising an inorganic powder shaped in a sheet form with a silicone resin, an ink comprising a coloring agent and a silicone resin, and a label comprising the label substrate having formed thereon a pattern comprising the ink, are disclosed. The label is flexible, can form a pattern according to circumstances, and can fix onto an article by a low-temperature heating, a pattern having excellent opacifying strength or reflectivity, weather resistance, heat resistance, resistance to chemicals, and the like.

10 Claims, 1 Drawing Sheet

LABEL SUBSTRATE INK AND LABEL

This is a continuation of application No. 08/153,169 filed Nov. 17, 1993, now abandoned.

FIELD OF THE INVENTION

The present invention relates to a label substrate excellent in a opacifying strength or a reflectivity and suitable for forming an identification label, etc., an ink for forming a pattern on the label substrate, and labels having formed thereon various patterns.

BACKGROUND OF THE INVENTION

In a change of a production system to a small production system of producing many kinds of products, it has been an important theme to provide labels which can be easily used for the management of products, half-finished goods, parts, etc., made of heat-resistant plastics, metals, glasses, burned ceramics, etc.

Hitherto, a label obtained by forming a pattern with an ink containing a glass powder on a label substrate formed using a glass powder and an organic binder having a burn off property, temporarily adhering the label substrate having formed thereon the pattern to an article, and burning the assembly to form a burned pattern on the material is known as the labels used for the above purposes.

The above label is flexible, can form a pattern according to circumstances, and can fix a burned pattern on an article under a burning treatment. Accordingly, various problems caused by a label of a type using a substrate composed of a burned ceramic, a metal, a porcelain enamel, etc., such as the problem of lacking in an easily fixing property due to a complicated fixing work such as screwing, etc., the problem of lacking in an adhesive property to a curved surface due to the rigidity of the substrate, the problem of lacking in an expedient forming property of labels due to the difficulty of forming patterns on the spot, the problem of lacking in the formation of various kinds of labels necessary for the management, etc., of various parts under a small production system of producing many kinds of products, etc., can be overcome.

However, in the conventional label described above, there is a problem to require a burning treatment of the glass powder contained in order to fix the applied pattern by exhibiting the weather resistance and the heat resistance of the label substrate. Also, the burning treatment gives a problem that a part of the organic binder having a burn off property contained in the label substrate is carbonized at burning to change the opacifying strength, whereby the contrast with the pattern formed is liable to lower.

Furthermore, when a large amount of a low-melting glass such as lead glass, etc., is used to conduct the burning treatment at a low temperature, there is a problem that a label which can be burned at a low temperature and has excellent resistance to chemicals cannot be obtained due to the difficulty of the occurrence of falling or disturbing of the applied pattern by the dissolution thereon in the case of immersing in a solution of an alkali, a strong acid, etc.

SUMMARY OF THE INVENTION

Accordingly, one object of the present invention is to provide a label which is flexible, can form a pattern according to circumstances, and can fix onto an article by a low-temperature heating, a pattern excellent in the opacifying strength or the reflectivity, the weather resistance, the heat resistance, the resistance to chemicals, etc.

Another object of the present invention is to provide a substrate for the label.

Further object of the present invention is to provide an ink for forming the pattern on the substrate.

According to one embodiment of the present invention, there is provided a label substrate comprising an inorganic powder formed in a form of a sheet with a silicone resin.

According to another embodiment of the present invention, there is provided an ink for forming a pattern on the label substrate, comprising a coloring agent and a silicone resin.

According to further embodiment of the present invention, there is provided a label comprising the label substrate having formed thereon a pattern comprising the ink.

DETAILED DESCRIPTION OF THE INVENTION

The present invention is described in detail below.

The label substrate and the label having the constructions described above are flexible and have a good adhesion property to a curved surface, and a pattern, an identification form, etc., can be formed according to circumstances on the label substrate by an engraving system, a punching system, or a proper printing system such as a heat transfer printing, a screen printing, etc.

On the other hand, by using the label substrate and the ink each using a silicone resin, the label substrate and the pattern formed by the ink can be rigidified by a low-temperature heating for hardening the silicone resin while keeping well the pattern formed or the form thereof without inducing the carbonization problem, and the pattern can be fixed to the article under temporarily adhering.

As a result thereof, the good pattern which is strongly fixed to an article without need of a burning treatment, is excellent in the heat resistance, the weather resistance, the resistance to chemicals, the strength, etc., as well as in the opacifying strength or the reflectivity, and is also excellent in the contrast with a backing is formed. On such a pattern, automatic reading by a reflective sensor can be smoothly practiced.

The label substrate of the present invention is formed by shaping (shape retention layer) an inorganic powder in a sheet form with a silicone resin and the label is formed by forming a pattern on such a sheet by a proper method.

Figure 1:
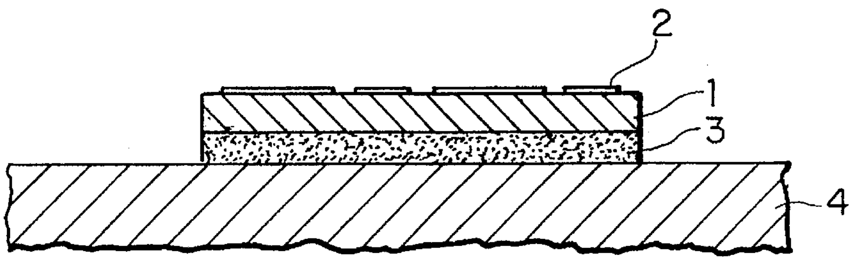
FIG. 1 is a cross sectional view showing one example of the label of the present invention.

An example of the label of the present invention is shown in FIG. 1. As shown in FIG. 1, a pattern layer 2 is formed on the surface of a label substrate 1, and if necessary, a pressure-sensitive adhesive layer 3 is formed on the other surface of the label substrate 1. In addition, numeral 4 is an article to which the label substrate having the pattern is applied.

For the label substrate, the shape retention layer may exist as a sheet form and hence the label substrate can be formed in a proper form. Examples thereof are the form composed of the shape retention layer (FIG. 1), the form of a shape retention layer 11 reinforced by reinforcing substrate 12 as shown in FIG. 2, and the form composed of the shape retention layer having a pressure-sensitive adhesive layer.

Figure 2:
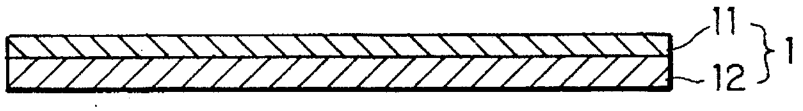
FIG. 2 is a cross sectional view showing one example of the label substrate of the present invention.

The above-described reinforcing embodiment may be properly formed by a system of forming the shape retention layer on the reinforcing substrate as shown in FIG. 2, a system of impregnating a reinforcing substrate with a material forming a shape retention layer, or a system of interposing a reinforcing substrate in a shape retention layer.

As the reinforcing substrate, a proper substrate such as a resin-coated layer, a film, fibers, a cloth, a nonwoven fabric, a metal foil, a net, etc., can be used. The reinforcing substrate can be formed by a polymer which is burned off at the heat treatment, such as polyester, polyimide, a fluorine resin, polyamide, etc., or can be formed by a material which is not burned off by the heat treatment, such as a glass, a ceramic, a metal, etc.

The inorganic powder used for the formation of the shape retention layer functions to improve the heat resistance (usually about 800° C. or less) and form the backing color of the label. Accordingly, a proper inorganic powder such as a metal powder, a ceramic powder, etc., can be used. One or more kinds of the inorganic powders can be used and the particle sizes of the inorganic powder are generally 50 μm or less, and preferably from 0.05 to 20 μm although the particle sizes thereof are not limited to them. In addition, the inorganic powder may be adhered to thin materials such as mica to form flaky powders and the use of such flaky powders is effective for the improvement of the opacifying strength or the reflectivity.

An example of the inorganic powder generally used is a powder of a white material such as silica, alumina, zinc white, zirconia, calcium oxide, mica, etc. Also, metal compounds such as metal carbonates, metal nitrates, metal sulfates, etc., which become such oxidized type white ceramics by being oxidized at a temperature of not higher than the temperature of heat-treating the label can be used as the inorganic powder.

Other examples of the inorganic powder used in the present invention are red materials including metal ions such as iron ions, copper ions, gold ions, chromium ions, selenium ions, etc., e.g., manganese oxide-alumina, chromium oxide•tin oxide, iron oxide, and cadmium sulfide•selenium sulfide; blue meterials including metal ions such as manganese ions, cobalt ions, copper ions, iron ions, etc., e.g., cobalt oxide, zirconia•vanadium oxide, and chromium oxide•divanadium pentoxide; black materials including metal ions such as iron ions, copper ions, manganese ions, chromium ions, cobalt ions, etc., e.g., chromium oxide•cobalt oxide•iron oxide•manganese oxide, chromates, and permenganates; etc.

Still other examples of the inorganic powder are yellow materials including metal ions such as vanadium ions, tin ions, zirconium ions, chromium ions, titanium ions, antimony ions, etc., e.g., zirconium•silicon•praseodymium, vanadium•tin, and chromium•titanium•antimony; green materials including metal ions such as chromium ions, aluminum ions, cobalt ions, calcium ions, etc., e.g., chromium oxide, cobalt•chromium and alumina-chromium; and pinc materials including metal ions such as iron ions, silicon ions, zirconium ions, aluminum ions, manganese ions, etc., e.g., aluminum•manganese and iron•silicon•zirconium.

The silicone resin used for shaping the inorganic powder is silicone resins having the structural unit represented by $R_3SiO$, $R_3SiO_{1/2}$, $R_2SiO_2$, $R_2SiO$, $RSiO_3$, $SiO_2$, $RSiO_{3/2}$ [wherein R represents an organic group such as an aliphthatic hydrocarbon group (e.g., methyl, ethyl, propyl, etc.), an aromatic hydrocarbon group (e.g., phenyl, etc.), an olefin group (e.g., vinyl, etc.), etc.; or a hydrolyzable group such as a hydroxy group], etc., are used.

In general, a curing type polyorganosiloxane commercially available as a silicone varnish, etc., comprising polymethylsiloxane, polyphenylsiloxane, etc., is used. Also, an alkyd-modified silicone resin, a phenol-modified silicone resin, a melamine-modified silicone resin, an epoxy-modified silicone resin, a urethane-modified silicone resin, etc., can be used. The curing type polyorganosiloxane is cured by a heat treatment at a temperature of from about 200° to 300° C. and when the temperature is further increased, the polyorganosiloxane releases an organic group and finally shows the change of converting into silica, whereby it is excellent in heat resistance.

A silicone resin which can be preferably used in the present invention is excellent in the shape retention power and flexibility and contains a hydrolyzable group such as a hydroxyl group, etc., in a proportion of from about 2.4 to 3 based on the functional group content. Also, in the case of polyphenylethylsiloxane, it is preferred that the content of the phenyl group in the total organic groups is from 20 to 60 mol %. Furthermore, when the shape retention layer is exposed to high temperature of about 500° C., polymethylsiloxane giving small heating loss and showing small heat shrinkage at high temperature is preferably used.

The label substrate of the present invention can be formed by, for example, a method of mixing one or more kinds of inorganic powders and a silicone resin using an organic solvent, etc., and applying the mixture, if necessary, on a support such as a reinforcing substrate, separator, etc., by a proper method followed by drying.

The amount of the silicone resin used is properly determined according to the handling property of the label substrate and the strength, the opacifying strength, etc., of the label, but is generally from 20 to 300 parts by weight, and preferably from 50 to 150 parts by weight, per 100 parts by weight of the inorganic powder. In addition, as the organic solvent, a proper solvent can be used, and toluene, xylene, butylcarbotol, ethyl acetate, butylcellosolve acetate, methyl ethyl ketone, methyl isobutyl ketone, etc., are generally used.

There is no particular restriction on the mixture of the inorganic powder, the silicone resin, and the organic solvent, but it is preferred that the mixture is prepared such that the concentration of the solid components becomes from 5 to 85% by weight from the points of the coating property, etc. At the preparation of the mixture, if necessary, proper additives such as a dispersant, a lubricant, a combustion improver, etc., can be compounded with the mixture.

The coating method of the mixture, which is preferably used is a method having excellent layer thickness controlling property, such as a doctor blade method, a gravure roll coating method, etc. In this case, it is preferred to use a defoaming agent to perform a sufficient defoaming treatment such that bubbles do not remain in the coating layer.

The thickness of the label substrate or the shape retention layer formed can be properly determined, but is generally from 10 μm to 5 mm, and preferably from 20 μm to 200 μm. If the thickness is less than 10 μm, the strength of the label substrate or the shape retention layer is poor, while if the thickness is over 5 mm, cracks, etc., are liable to format the heat treatment.

The label substrate of the present invention can be a porous form for smoothly releasing decomposed gases due to heating. For example, when a pressure-sensitive adhesive layer for temporarily adhering the label substrate is formed on the substrate, it sometimes happens that the label is expanded with the decomposed gases due to heating and the occurrence of such a phenomenon can be prevented by using a porous label substrate.

Figure 3:
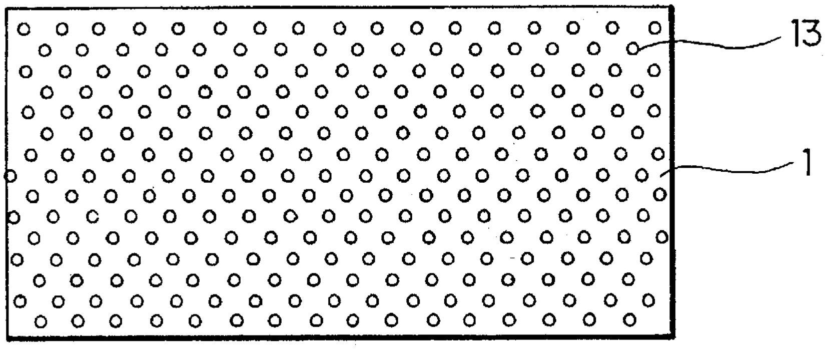
FIG. 3 is a plane view showing another example of the label substrate of the present invention.

The porous label substrate is formed by a proper method such as a method of forming many fine holes 13 in the label substrate 1 by a punching system, etc., as shown in FIG. 3, a method of using a woven fabric or a nonwoven fabric for the reinforcing substrate or using a metal foil or a net having formed many fine holes as the reinforcing substrate, or the like.

The porous label substrate capable of releasing decomposed gases can also be obtained by a method of introducing an organic compound which is decomposable at low temperature and is a solid at normal temperature into the shape retention layer in the case of forming the label substrate. In this case, such an organic material is decomposed and burned off before the formation of a hard film of the silicone resin by the heat treatment, which results in forming porous hard film of the silicone resin. Hence, decomposed gases formed in the subsequent heat treatment are smoothly released through the holes. Accordingly, where it is intended to release the decomposed gases of the organic components forming the pressure-sensitive layer, an organic compound which is decomposed at a temperature lower than the decomposition temperature of the organic components forming the pressure-sensitive adhesive layer is used.

The organic compound preferably used is a compound which functions as a binder for the inorganic powder as well as for the silicone resin before the heat treatment. Examples of the organic compound are hydrocarbon resins, vinyl resins, or styrene resins, acetal resins, butyral resins, acrylic resins, polyester resins, urethane resins, cellulose resins, various kinds of waxes, etc., and of those materials, acrylic resins are particularly preferred. The amount of the organic compound used is generally from 5 to 100 parts by weight, and preferably from 10 to 50 parts by weight, per 100 parts by weight of the silicone resin.

The label substrate of the present invention is preferably used for the purpose of temporarily adhering onto an article as it is or as a label having formed thereon a pattern, followed by heating and fixing the heat-treated material of the substrate or label to the article under the heat treatment. A method can also be employed in the present invention, wherein at the heat treatment, a material to be fixed is adhered to the label substrate and the assembly is heated to fix the material to be fixed to an article via the heat-treated material of the substrate.

Onto the label substrate or the label can be formed, if necessary, a pressure-sensitive adhesive layer for increasing the temporarily adhering property to an article. The pressure-sensitive adhesive layer can be formed on the label substrate at an appropriate stage before the label substrate, etc., is temporarily adhered to an article and they are subjected to a heat treatment. Thus, the pressure-sensitive adhesive layer can be previously formed on the label substrate before forming a pattern thereon to provide a label or after forming the label.

The pressure-sensitive adhesive layer can be formed with a proper organic or inorganic pressure-sensitive material having a temporarily adhering force to an article. The pressure-sensitive material can be proply selected and used according to the heat-treatment temperature, etc., and examples thereof are inorganic pressure-sensitive materials such as a water glass adhesive, etc., silicone adhesives, rubber adhesives, acrylic adhesives, vinyl alkyl ether adhesives, expoxy adhesives, etc.

It is preferred that the silicone adhesive can be used in a wide temperature range as same as the silicone resin used for the label substrate. Examples thereof are those having as the structural component a condensation product of a copolymer having structural units of $SiO_2$ and $R_3SiO_{1/2}$ and a polyorganosiloxane having a structural unit of $R_2SiO$ and an olefin group such as a vinyl group, or a hydrolyzable group such as a hydroxy group at the terminal of the molecular chain. In the above formulae, R represents a substituted or unsubstituted organic group such as an aliphatic hydrocarbon group (such as, methyl, ethyl, propyl, etc.), an aromatic hydrocarbon group (such as phenyl, etc.), an olefin group (such as vinyl, etc.), etc.

In conducting the heat treatment at a temperature of 400° C. or higher, an organic adhesive, in particular, a rubber adhesive or an acrylic adhesive, which is decomposed and burned off at a relatively low temperature of from 200° to 300° C. is preferably used. Examples thereof are those comprising a polymer such as a natural rubber, a synthetic rubber, a butyl rubber, a polyisoprene rubber, a styrene-butadiene rubber, a styrene-isoprene-styrene block copolymer, a styrene-butadiene-styrene block copolymer, etc., or those comprising 100 parts by weight of the above-described polymer or a polymer comprising an alkyl ester polymer of acrylic acid or methacrylic acid and from 10 to 300 parts by weight of a tackifying resin such as a petroleum resin, a terpene resin, a rosin resin, xylene resin, a coumarone-indene resin, etc., and, if required and necessary, further comprising additives such as a softener, an antioxidant, a coloring agent, a filler, etc.

On the other hand, when the label substrate is temporarily adhered to an article in a wet state, such as a pottery before burning, a hydrophilic adhesive such as a polyvinyl alcohol adhesive, a polyvinyl pyrrolidone adhesive, a polyacrylamide adhesive, a cellulose adhesive, etc., can be preferably used. An example of such a hydrophilic adhesive is an adhesive prepared by compounding a water-soluble polymer or a hydrophilic polymer such as polyvinyl alcohol, polyvinyl pyrrolidone, polyacrylamide, an acrylic acid copolymer, polyvinyl methyl ether, etc., a tackifier such as glycerol, polyethylene glycol, polyether polyol, polyoxyethylene phenol ether, polyoxyethylene alkylphenol ether, etc., a crosslinking agent, a filler, etc.

Figure 4:
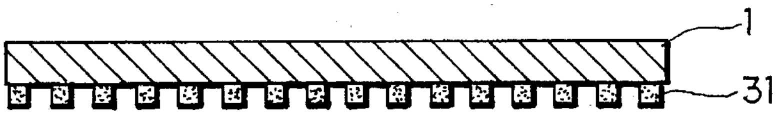
FIG. 4 is a cross sectional view showing still another example of the label substrate of the present invention.

When the adhesive layer is burned off at the heat treatment, the label substrate can be fixed to an article material via a silicone resin, and in the present invention, if necessary, a low melting frit may be incorporated in the adhesive layer to improve the fixing property to the article. On the other hand, the adhesive layer may be formed in an interspersed state for the smooth release of the decomposed gases of the adhesive layer at the heat treatment. In this case, it is more preferred that the label substrate is in a porous form. One example of the label substrate 1 having formed thereon an adhesive layer 31 in an interspersed state is shown in FIG. 4.

A material which is softened or melted at a temperature lower than the definite heat-treatment temperature to adhere the adhesive layer to the article is used as the low melting frit described above. In general, a glass powder or a ceramic powder which is vitrified at the heat treatment is used. As the glass powder, an appropriate glass powder is used according to the heat-treatment temperature. For example, when the heat-treatment temperature is from 400° to 850° C., a lead glass powder (400° to 600° C.), a borosilicate lead glass powder or a soda glass powder (500° to 850° C.), etc., can be used.

The adhesive layer is formed on the label substrate or the label by a proper method according to a formation method of an adhesive tape, such as a method of coating the adhesive material by a proper coating method such as a doctor blade method, a gravure roll coating method, etc., a method of transferring an layer formed on a separator onto the label substrate or the label, etc. Also, the adhesive layer patterned in an interspersed state can be formed by a coating method such as rotary screen method, etc.

The thickness of the adhesive layer formed can be determined according to the purpose of use and is generally from 1 to 500 μm.

In addition, it is preferred to cover the adhesive layer formed on the label substrate or the label with a separator, etc., until the label substrate or label is temporarily adhered to an article to prevent the occurrence of staining of the adhesive layer.

The formation of the label using the label substrate of the present invention can be conducted by forming a pattern comprising an ink or an engraved pattern comprising unevenness or by punching the label substrate in a proper form. A label having an optional pattern formed by combining the above pattern elements or having composite patterns formed by other various methods can be formed.

The ink which is used to form the label in the present invention is prepared using a coloring agent and a silicone resin as the components such that the pattern formed by the ink is integrated with the heated label substrate by the heat treatment. Such an ink can be prepared by mixing one or more kinds of coloring agents and a silicone resin using, if necessary, a solvent by a proper kneader such as a roll mill, a pot mill, etc., to prepare a fluid ink such as a pasty ink, etc.

As the coloring agent for forming the ink, in addition to the above-described examples as the inorganic powder for forming the label substrate, organic or inorganic pigments, carbon black, metal powders, and other elecrically conductive materials, resistance materials(which generate heat upon electric current passing), dielectric substances, etc., can be properly used according to the purpose of use. In general, however, an inorganic pigment is used as a coloring agent.

As the silicone resin for forming the ink, those described above as the silicone resins for forming the label substrate of the present invention can be used.

The amounts of the coloring agent used and the silicone resin used are properly determined by the contrast and the fixing property with the label, but the silicone resin is used in an amount of generally from 10 to 500 parts by weight, and preferably from 50 to 200 parts by weight, per 100 parts by weight of the coloring agent.

The ink may contain, if necessary, proper additives such as organic binder and/or a wax, a dispersant, a softener, a foaming agent, etc., in addition to the solvent. The use of an organic binder or a wax together with the inorganic powder and the silicone resin is particularly preferable from the point of the pattern forming property, etc., and the amount thereof may be properly determined but in general from about 10 to 50% by weight.

There is no particular restriction on the organic binder and the wax used and examples thereof are organic binders such as polyamide resins, petroleum resins, etc., and waxes such as paraffinic waxes, carnauba waxes, natural waxes, ester waxes, higher alcohol waxes, higher amide waxes, etc., in addition to those described above as the organic compounds which can be used together in the case of forming the label substrate.

The organic binder or the wax contained in the ink is usually burned off by, for example, thermal decomposition at the heat treatment, but may remain after the heat treatment in the present invention.

In addition, there are no particular restrictions on the solvent, softener, foaming agent, etc., described above, and conventional materials such as commercially available materials, etc., can properly be used. For example, examples of the solvent are toluene, isopropanol, solvent naphtha, etc., and examples of the softener are fats and oils, mineral oils, a rapeseed oil, vaseline, a xylene resin, a silicone oil, etc. The amounts of those used can be properly determined according to the purpose of use, etc., of the label.

A pattern is formed on the label substrate using the ink described above by an optional method. That is, a proper pattern forming method such as a hand writing method, a coating method through a pattern-forming mask, a method of transferring a pattern formed on a transfer paper, a method of forming a pattern by a printer, etc., can be employed. The method of forming a pattern by a printer has an advantage that a proper pattern can efficiently be formed with a good precision.

An ink sheet such as a print ribbon, etc., which is necessary in the case of forming a pattern by a printer such as an X-Y plotter, a wire dot type printer, a heat transfer type printer, an impact type printer, an ink jet type printer, etc., can be formed by applying a support substrate comprising a film, a cloth, etc., with the ink by a coating method, an impregnation method, etc. The support substrate used is a conventional substrate such as a plastic film, e.g., a polyester film, a polyimide film, a fluorine resin film, etc., or a cloth comprising fibers, e.g., polyamide fibers, polyester fibers, etc. Also, the ink sheet can be prepared as various ink sheets such as a heat transfer ink sheet, a press-printing ink sheet, a press-printing transfer ink sheet, etc., according to the object or the method for forming the pattern.

The pattern formed is optional. That is, an optional pattern such as a print pattern, a picture pattern, a bar code pattern, etc., can be formed. In addition, in the case of forming an identification label, etc., it is preferred to use the inorganic powder, the coloring agent, etc., by combining them such that a good contrast or a difference of color tone between the label substrate and the ink pattern after the heat treatment is formed.

Also, the method of forming a label on the label substrate by engraving a pattern comprising holes or unevenness and the pattern formed are optional. In the case of the hole pattern, an optional displaying system such as a system that the hole portions show the displaying content, a system that other remaining portions than the hole portions show the displaying content, etc., can be employed.

Furthermore, a method of forming a hole-line pattern of a punching system and finally leaving the inside portions only of the hole-line pattern on an article can be employed. This method can be preferably applied to the formation of, for example, a bar code pattern or a picture pattern. Also, this method is advantageous in the case that it is difficult to handle a punched material in the reason that the punched material tends to break, etc. In addition, the pattern comprising an unevenness can be utilized not only for the purpose of decoration but also for the formation of an identification label such as a bar code pattern, etc., which is applied to a reflective sensor.

The step of forming a pattern or a form on the label substrate may be before or after temporarily adhering the label substrate to an article. In the case of forming a patten by a printer, a method of previously applying a pattern on the label substrate to form a label and temporarily adhering the label substrate having formed thereon the pattern onto an article is usually used. A method of forming the label by applying a pattern, etc., on the label substrate after temporarily adhering the label substrate to an article has the advantage that the treatment efficiency is excellent in that an uneven pattern can be imparted under the temporarily adhering treatment or the advantage that the keeping property of the pattern is excellent in that occurrence of the deformation of the uneven pattern by temporarily adhering can be prevented.

In the case of previously forming a pattern on the label substrate, the surface of the pattern-formed surface may be, if necessary, protected by adhering thereto a separator, etc., before subjecting the label substrate to the heat treatment. In the case of the transfer method, the transfer paper is used as the separator for the protection without releasing the transfer paper. In addition, an automatic adhering method using a robot, etc., can be employed to temporarily adhere the label substrate or the label to an article.

The heat treatment of the temporarily adhered assembly of the label substrate and the article can be conducted under a proper heating condition according to the heat resistances of the label substrate and the article. By the heat treatment, organic components such as the organic binder, the pressure-sensitive adhesive layer, etc., except for the silicone resin and the silicone adhesive are generally burned off by the heat treatment, and silicone components are crosslinked and cured while melting the label substrate and the applied pattern, whereby the label is fixed to the article.

The label substrate or the label of the present invention can be preferably used for various purposes such as muffle painting on various articles such as potteries, glass products, ceramic products, metal products, enamel products, etc., the formation of identification marks comprising colored or classifying pattern, a bar code, etc., the formation of a circuit pattern on an IC substrate, the formation of a pattern such as an electrode, an electric resistance, a dielectric, etc. Accordingly, there is no particular restriction on the article to which the pattern is formed, and an article durable to a definite heating temperature is used. Also, wet materials such as unburned ceramic moldings, unburned potteries, etc., can be used as the article to which the pattern is applied and in this case, the heat treatment for the ceramic moldings, etc., can be utilized as the heat treatment for the label. In addition, the article to which the label is applied may have an optional form such as a tabular form, a vessel form, etc.

In addition, the present invention was explained above in the case of applying a pattern onto an article as a label using the label substrate of the present invention, but in the ink or the ink sheet of the present invention, a pattern can be applied to an article using the ink or the ink sheet without using the label substrate.

That is, a pattern is directly applied onto an article according to the case of forming the label using the ink or the ink sheet of the present invention, or a pattern comprising the ink wherein a coloring agent is bonded with the crosslinked cured material of the silicone component can be formed on an article by transferring the pattern formed on a transfer paper onto the article and heat-treating them as described above. Accordingly, in this case, muffle painting or the application of an identification mark on various articles or the formation of a pattern such as a circuit, an electrode, an electric resistance, a dielectric, etc., on various articles can be conducted in the same manner as above.

As described above, the label substrate or the label of the present invention is flexible, has an excellent adhesive property to a curved surface, and can give an identification form according to circumstances by various methods. Also, the label substrate or the label of the present invention can strongly fixed to an article by a low-temperature heating without need of a burning treatment and a good pattern excellent in the heat resistance, the weather resistance, the resistance to chemicals, the strength, etc., excellent in the opacifying strength or reflectivity, and also excellent in contrast can be formed. Furthermore, the ink of the present invention can be strongly fixed to an article by low-temperature heating and can form a pattern excellent in the heat resistance, the weather resistance, the resistance to chemicals, the strength, etc.

The present invention is described in more detail by reference to the following Examples and Comparative Examples, which should not be construed as limiting the scope of the invention. Unless otherwise indicated, all parts, percents, ratios and the like are by weight.

EXAMPLE 1

To a xylene solution containing 30 parts of polyphenylmethylsiloxane having an average molecular weight (calculated as a polystyrene; hereinafter the same) of about 300,000 and a hydroxyl group content of 1 mol % were added 15 parts of a titania powder having a mean particle size of 0.2 μm and a talc powder having a mean particle size of 0.8 μm followed by homogeneously mixing. The resulting dispersion was coated on a separator composed of a glassine paper having a thickness of 70 μm treated with a silicone releasing agent by a doctor blade method, and dried to form a shape retention layer having a thickness of 80 μm, whereby a label substrate was obtained.

On the other hand, a toluene solution containing 100 parts of polybutyl acrylate having an average molecular weight of about 1,000,000 and 20 parts of polyphenylmethylsiloxane having an average molecular weight of about 10,000 was coated on the same type of the separator as described above by a doctor blade method followed by drying to form a pressure-sensitive adhesive layer having a thickness of 20 μm, and the pressure-sensitive adhesive layer was transferred and adhered on one surface of the above label substrate.

Furthermore, to a xylene solution containing 100 parts of polydimethylsiloxane having an average molecular weight of about 100,000 were added 100 parts of a black pigment composed of chromium oxide-iron oxide-cobalt oxide-manganese oxide and having a mean particle size of 0.5 μm followed by homogeneously mixing to obtain an ink. The ink was gravure-coated on a polyester film having a thickness of 6 μm followed by drying to hold the ink, thereby obtaining an ink sheet having an ink layer having a thickness of 6 μm.

A bar code pattern composed of the ink was formed on the surface of the shape retention layer of the above label substrate through a heat transfer type printer and the ink sheet prepared above to obtain a label.

EXAMPLE 2

To a xylene solution containing 50 parts of polyhydroxymethylsiloxane having an average molecular weight of about 400,000 were added 43 parts of a titania powder having a mean particle size of 0.5 μm followed by homogeneously mixing. The resulting dispersion was coated on a separator composed of the polyester film having a thickness of 50 μm treated with a silicone releasing agent, and dried to form a shape retention layer having a thickness of 80 μm. On the shape retention layer was transferred and adhered a pressure-sensitive adhesive layer having a thickness of 20 μm obtained by the same manner as in Example 1 to obtain a label substrate.

On the other hand, to a xylene solution containing 100 parts of polyhydroxymethylsiloxane having an average molecular weight of about 200,000 were added 100 parts of a blue pigment composed of cobalt oxide and having a mean particle size of 0.5 μm followed by homogeneously mixing to form an ink. The ink was coated on a polyester film having a thickness of 6 μm by a doctor blade method, and dried to obtain an ink sheet having an ink layer having a thickness of 4 μm.

A bar code pattern composed of the ink was formed on the surface of the shape retention layer of the label substrate described above through a heat transfer type printer and the ink sheet obtained above to obtain a label.

EXAMPLE 3

To a xylene solution containing 30 parts of polydimethylsiloxane having an average molecular weight of about 500,000 and 10 parts by weight of polyoctyl methacrylate having an average molecular weight of about 50,000 were added 30 parts of a titania powder having a mean particle size of 0.5 μm followed by homogeneously mixing. The resulting dispersion was coated on the separator composed of a glassine paper having a thickness of 70 μm treated with a silicone releasing agent by a doctor blade method, and dried to form a shape retention layer having a thickness of 100 μm, whereby a label substrate was obtained.

On the other hand, a toluene solution of polybutyl acrylate having an average molecular weight of about 1,000,000 was coated on the same type of separator as described above by a doctor blade method followed by drying to form a pressure-sensitive adhesive layer having a thickness of 20 μm. The pressure-sensitive adhesive layer was transferred and adhered on one surface of the above label substrate.

Furthermore, to a xylene solution containing 100 parts of polydimethylsiloxane having an average molecular weight of about 300,000 were added 100 parts of the black pigment as used in Example 1 followed by homogeneously mixing to form an ink. The ink was coated on a polyester film having a thickness of 6 μm by a doctor blade method, and dried to obtain an ink sheet having an ink layer having a thickness of 5 μm.

A bar code pattern was formed on the surface of the shape retention layer of the label substrate obtained in Example 1 through a heat transfer type printer and the ink sheet to obtain a label.

EXAMPLE 4

By following the same procedure as in Example 3 except that 10 parts of a glass powder mainly composed of PbO, $B_2O_3$, and ZnO was additionally compounded with the pressure-sensitive adhesive layer and the pressure-sensitive adhesive layer was transferred and adhered on one surface of the label substrate as prepared in Example 3, a label substrate and a label were obtained.

EXAMPLE 5

By following the same procedure as in Example 3 except that a pressure-sensitive adhesive layer comprising a polyorganosiloxane having an average molecular weight of about 500,000 was formed and the pressure-sensitive adhesive layer was transferred and adhered on one surface of the label substrate obtained in Example 1, a label substrate and a label were obtained.

EXAMPLE 6

A label substrate having punched holes having a diameter of 1 μm with a pitch of 50 μm was formed by applying a punching treatment to the labels substrate as used in Example 1. By following the same procedure as Example 4 using the label substrate thus prepared, a label was obtained.

EXAMPLE 7

A toluene solution containing 100 parts of polybutyl acrylate having an average molecular weight of about 1,000,000 and 20 parts of polyphenylmethylsiloxane having an average molecular weight of about 10,000 was pattern-coated on a separator composed of a polyester film having a thickness of 50 μm treated with a silicone releasing agent by a rotary screen method followed by drying to form a pressure-sensitive adhesive layer having a spot-form pressure-sensitive adhesive layer having a thickness of 30 μm a zigzag pattern at a diameter of 0.7 mm and a pitch of 1.0 mm. The pressure-sensitive adhesive layer was transferred and adhered on the label substrate as used in Example 1, and an ink pattern was applied thereto to obtain a label.

EXAMPLE 8

To a xylene solution containing 30 parts of polyphenylmethylsiloxane having an average molecular weight of about 300,000 and a hydroxyl group content of 1% by weight were added 15 parts of a titania powder having a mean particle size of 0.2 μm and 15 parts of a talc powder having a mean particle size of 0.8 μm followed by homogeneously mixing. A glass cloth having a thickness of 200 μm was impregnated with the dispersion obtained above to obtain a label substrate. Using the label substrate, a label was obtained in the same procedure as in Example 4.

COMPARATIVE EXAMPLE

To a toluene solution containing 100 parts of a binder comprising an acrylic polymer having an average molecular weight of about 100,000 were added 150 parts of a glass powder mainly comprising PbO, $SiO_2$, $B_2O_3$, and $Al_2O_3$ and having a mean particle size of 10 μm and 50 parts of a titania powder having a mean particle size of 0.3 μm followed by homogeneously mixing by a ball mill. The dispersion thus obtained was coated on a separator comprising a glassine paper having a thickness of 70 μm treated with a silicone releasing agent by a doctor blade method, and dried to form a shape retention layer having a thickness of 50 μm, whereby a label substrate was obtained.

On the other hand, a toluene solution of polybutyl acrylate having an average molecular weight of about 500,000 was coated on the same type of separator as described above by a doctor blade method followed by drying to form a pressure-sensitive adhesive layer having a thickness of 30 μm. The pressure-sensitive adhesive layer was transferrred and adhered on one surface of the above label substrate.

A bar code pattern comprising an ink was formed on the surface of the shape retention layer of the above label substrate through a heat transfer type printer and an ink sheet to obtain a label.

The ink sheet used above was formed by mixing 50 parts of a black pigment composed of chromium oxide•iron oxide•cobalt oxide•manganese oxide having a mean particle size of 0.5 μm, 100 parts of a glass powder mainly comprising PbO, $SiO_2$, $B_2O_3$, and $Al_2O_3$ and having a mean particle size of 2 μm, 100 parts of a paraffin wax using 80 parts of hexane by a ball mill to obtain an ink. The ink was gravure-coated on a polyester film having a thickness of 6 μm to form an ink layer having a thickness of 5 μm.

EVALUATION TEST

Reflectivity:

The separator was released from each of the labels obtained in the Examples and the Comparative Example. Each label was temporarily adhered to a glass plate via the pressure-sensitive adhesive layer. The resulting assembly was heat-treated in air at a temperature of from 350° C. to 400° C. for 30 minutes to obtain a glass plate having strongly fixed the heated label having a black or blue (Example 2) bar code pattern on a white backing in a clear state. The reflectivity at the white backing was determined by light having wavelengths of from 400 to 800 nm.

The results obtained are shown in Table 1 below. Fixing Force:

After immersing each heated label obtained in 8% aqueous solution of sodium hydroxide at 80° C. or a 12% aqueous solution of hydrofluoric acid at 25° C., for 30 seconds, the label was taken out of the solution. The surface of the label was rubbed with a nonwoven fabric to determine the fixing force of the pattern formed. The fixing force was evaluated by the following standards. The results obtained are shown in Table 1 below.

©: No vanishment of the pattern was observed and the same readability as the initital pattern was kept.

©: Vanishment of the pattern was partially observed but there was no problem for the readability.

x: Reading of the pattern became impossible by the vanishment of the pattern.

In addition, the organic components such as the acrylic polymers, etc., in the label substrates and the pressure-sensitive adhesive layers in the Examples were burned off by the heat treatment but the polyorganosilocane was left in the cured state in each case. On the other hand, in the Comparative Example, the organic components such as the acrylic polymer, etc., were burned off, and the label obtained was in a burned state through the glass powder.

TABLE 1

| | Heat Treatment: 350° C. | | | Heat Treatment: 400° C. | | |
|---|---|---|---|---|---|---|
| | Reflectivity | Fixing Force | | Reflectivity | Fixing Force | |
| | (%) | NaOHag | HFaq | (%) | NaOHaq | HFaq |
| Example 1 | 85 | ○ | ○ | 81 | ◎ | ◎ |
| Example 2 | 85 | ◎ | ◎ | 80 | ◎ | ◎ |
| Example 3 | 60 | ◎ | ◎ | 80 | ◎ | ◎ |
| Example 4 | 62 | ◎ | ◎ | 79 | ◎ | ◎ |
| Example 5 | 62 | ◎ | ◎ | 79 | ◎ | ◎ |
| Example 6 | 83 | ○ | ○ | 82 | ◎ | ◎ |
| Example 7 | 86 | ○ | ○ | 81 | ◎ | ◎ |
| Example 8 | 82 | ○ | ○ | 80 | ◎ | ◎ |
| Comparative Example | 20 | x | x | 70 | x | x |

It can be seen from the results shown above that the labels in the Examples of the present invention are excellent in the reflectivity and, in particular, the fixing force as compared to the label of the Comparative Example.

While the invention has been described in detail and with reference to specific embodiments thereof, it will be apparent to one skilled in the art that various changes and modifications can be made therein without departing from the spirits and scope thereof.

What is claimed is:

1. A label sheet comprising an inorganic powder shaped in a sheet form with a silicone resin, wherein a surface of the label sheet has a reflectivity determined by light having a wavelength of from 400 to 800 nm of at least 60% when heat-treated in air at a temperature of 350° C. for 30 minutes.

2. The label sheet of claim 1, wherein the label sheet has a reinforcing substrate.

3. The label sheet of claim 2, wherein the reinforcing substrate is a porous substrate.

4. The label sheet of claim 1, wherein the label sheet has many fine holes.

5. The label sheet of claim 1, wherein the label sheet contains an organic compound which is decomposable at a temperature lower than the hardening temperature of the silicone resin and is a solid at room temperature, and the label sheet is porous.

6. A label comprising the label sheet as claimed in claim 1 having formed thereon a pattern comprising an ink comprising a silicone resin in and a coloring agent.

7. The label sheet of claim 1, wherein the label sheet has a pressure-sensitive adhesive layer.

8. The label sheet of claim 7, wherein the pressure-sensitive layer comprises a silicone pressure-sensitive adhesive.

9. The label sheet of claim 7, wherein the pressure-sensitive layer contains a low melting frit.

10. The label sheet of claim 7, wherein the label substrate has the pressure-sensitive adhesive layer in an interspersed state.

* * * * *